United States Patent
Auxier

(10) Patent No.: US 10,927,695 B2
(45) Date of Patent: Feb. 23, 2021

(54) ABRADABLE COATING FOR GROOVED BOAS

(71) Applicant: United Technologies Corporation, Farmington, CT (US)

(72) Inventor: James Tilsley Auxier, Farmington, CT (US)

(73) Assignee: RAYTHEON TECHNOLOGIES CORPORATION, Waltham, MA (US)

( * ) Notice: Subject to any disclaimer, the term of this patent is extended or adjusted under 35 U.S.C. 154(b) by 344 days.

(21) Appl. No.: 16/201,164

(22) Filed: Nov. 27, 2018

(65) Prior Publication Data
US 2020/0165932 A1     May 28, 2020

(51) Int. Cl.
*F01D 11/12*     (2006.01)

(52) U.S. Cl.
CPC ........ *F01D 11/122* (2013.01); *F05D 2230/90* (2013.01)

(58) Field of Classification Search
CPC ........ F01D 11/08; F01D 11/12; F01D 11/122; F05D 2250/18; F05D 2250/28; F05D 2240/11
See application file for complete search history.

(56) References Cited

U.S. PATENT DOCUMENTS

| | | | |
|---|---|---|---|
| 4,377,371 A | 3/1983 | Wisander et al. | |
| 4,914,794 A | 4/1990 | Strangman | |
| 5,352,540 A | 10/1994 | Schienle et al. | |
| 6,102,656 A | 8/2000 | Nissley et al. | |
| 6,224,936 B1 | 5/2001 | Strangman | |
| 6,235,370 B1 | 5/2001 | Merrill et al. | |
| 6,251,526 B1 | 6/2001 | Staub | |
| 6,316,078 B1 | 11/2001 | Smialek | |
| 6,457,939 B2 | 10/2002 | Ghasripoor et al. | |
| 6,887,528 B2 | 5/2005 | Lau et al. | |
| 7,665,961 B2 * | 2/2010 | Lutjen | F01D 11/08 415/173.1 |
| 7,736,760 B2 | 6/2010 | Nicoll et al. | |
| 8,061,978 B2 | 11/2011 | Tholen et al. | |
| 8,357,454 B2 | 1/2013 | Kulkarni et al. | |
| 8,439,634 B1 * | 5/2013 | Liang | F01D 11/10 415/115 |
| 8,506,243 B2 | 8/2013 | Strock et al. | |

(Continued)

FOREIGN PATENT DOCUMENTS

| | | |
|---|---|---|
| EP | 0256790 | 2/1988 |
| EP | 2275645 | 1/2011 |

(Continued)

OTHER PUBLICATIONS

EP Search Report for EP Application No. 19211954 dated Mar. 23, 2020.

*Primary Examiner* — Aaron R Eastman
*Assistant Examiner* — Maxime M Adjagbe
(74) *Attorney, Agent, or Firm* — Carlson, Gaskey & Olds, P.C.

(57) ABSTRACT

A blade outer air seal includes a seal body that has a channel on a radially inner side that defines a first height portion outside of the channel and a second height portion within the channel. A first cavity is in the first height portion and a second cavity is in the second height portion. An abradable coating is over the radially inner side and fills the first and second cavities.

20 Claims, 4 Drawing Sheets

(56) References Cited

U.S. PATENT DOCUMENTS

| | | |
|---|---|---|
| 8,535,783 B2 | 9/2013 | Lutjen et al. |
| 8,888,446 B2 | 11/2014 | Ali et al. |
| 8,939,705 B1 | 1/2015 | Lee et al. |
| 9,194,243 B2 | 11/2015 | Bolcavage et al. |
| 9,289,917 B2 | 3/2016 | Bucci et al. |
| 9,297,269 B2 | 3/2016 | Morrison et al. |
| 9,920,646 B2 | 3/2018 | Lee et al. |
| 2008/0279678 A1* | 11/2008 | Merrill ............... F01D 9/06 415/173.4 |
| 2008/0280101 A1 | 11/2008 | Morrison et al. |
| 2011/0097538 A1 | 4/2011 | Bolcavage et al. |
| 2015/0337672 A1 | 11/2015 | McCaffrey et al. |
| 2016/0032766 A1* | 2/2016 | Bunker ............... F02C 7/18 165/170 |
| 2016/0032774 A1 | 2/2016 | Strock et al. |
| 2016/0040548 A1* | 2/2016 | Paulino ............ F01D 11/122 415/173.1 |
| 2016/0123160 A1 | 5/2016 | Strock |
| 2016/0201498 A1 | 7/2016 | Farris et al. |
| 2016/0236994 A1 | 8/2016 | Vetters et al. |
| 2016/0251970 A1 | 9/2016 | Strock et al. |

FOREIGN PATENT DOCUMENTS

| | | |
|---|---|---|
| EP | 2987960 | 2/2016 |
| EP | 3290639 | 3/2018 |
| GB | 2272453 | 8/1996 |
| WO | 2017177229 | 10/2017 |

\* cited by examiner

ABRADABLE COATING FOR GROOVED BOAS

BACKGROUND

This application relates to a blade outer air seal having a unique structure.

Gas turbine engines are known and typically include a compressor for compressing air and delivering it into a combustor. The air is mixed with fuel in the combustor and ignited. Products of the combustion pass downstream over turbine rotors, driving them to rotate.

It is desirable to ensure that the bulk of the products of combustion pass over turbine blades on the turbine rotor. As such, it is known to provide blade outer air seals radially outwardly of the blades.

SUMMARY

In one exemplary embodiment, a blade outer air seal includes a seal body that has a channel on a radially inner side that defines a first height portion outside of the channel and a second height portion within the channel. A first cavity is in the first height portion and a second cavity is in the second height portion. An abradable coating is over the radially inner side and fills the first and second cavities.

In a further embodiment of any of the above, the first and second cavities have the same depth relative to a radially outer side of the seal body.

In a further embodiment of any of the above, the abradable coating defines a first thickness at the first height portion and a second thickness at the second height portion. The first thickness is smaller than the second thickness.

In a further embodiment of any of the above, a ratio of a width of the channel to a hydraulic diameter of the second cavity is greater than about 1.5.

In a further embodiment of any of the above, the first and second cavities are two of a plurality of cavities spaced across a rub track portion of the radially inner side.

In a further embodiment of any of the above, the seal body is a ceramic matrix composite material.

In a further embodiment of any of the above, the seal body is a metallic alloy.

In a further embodiment of any of the above, the abradable coating is a geometrically segmented abradable coating formed from a ceramic material.

In a further embodiment of any of the above, the channel is linear.

In a further embodiment of any of the above, the channel is wavy.

In a further embodiment of any of the above, the channel extends in a circumferential direction.

In a further embodiment of any of the above, the cavities are circular.

In one exemplary embodiment, a method of forming a blade outer air seal includes forming at least one channel in a radially inner surface of a blade outer air seal body such that the radially inner surface has a first height portion outside of the channel and a second height portion in the channel. A first cavity is formed in the first height portion and a second cavity in the second height portion. An abradable coating is applied to the radially inner surface.

In a further embodiment of any of the above, the channel is milled into the radially inner surface.

In a further embodiment of any of the above, the channel is cast into the radially inner surface.

In a further embodiment of any of the above, the abradable coating fills the first and second cavities.

In a further embodiment of any of the above, the first and second cavities are drilled to the same depth relative to a radially outer side of the seal body.

In a further embodiment of any of the above, the seal body is a ceramic matrix composite material.

In a further embodiment of any of the above, the seal body is a metallic alloy.

In a further embodiment of any of the above, the abradable coating is a geometrically segmented abradable coating formed from a ceramic material.

These and other features may be best understood from the following drawings and specification.

DETAILED DESCRIPTION

Figure 1:
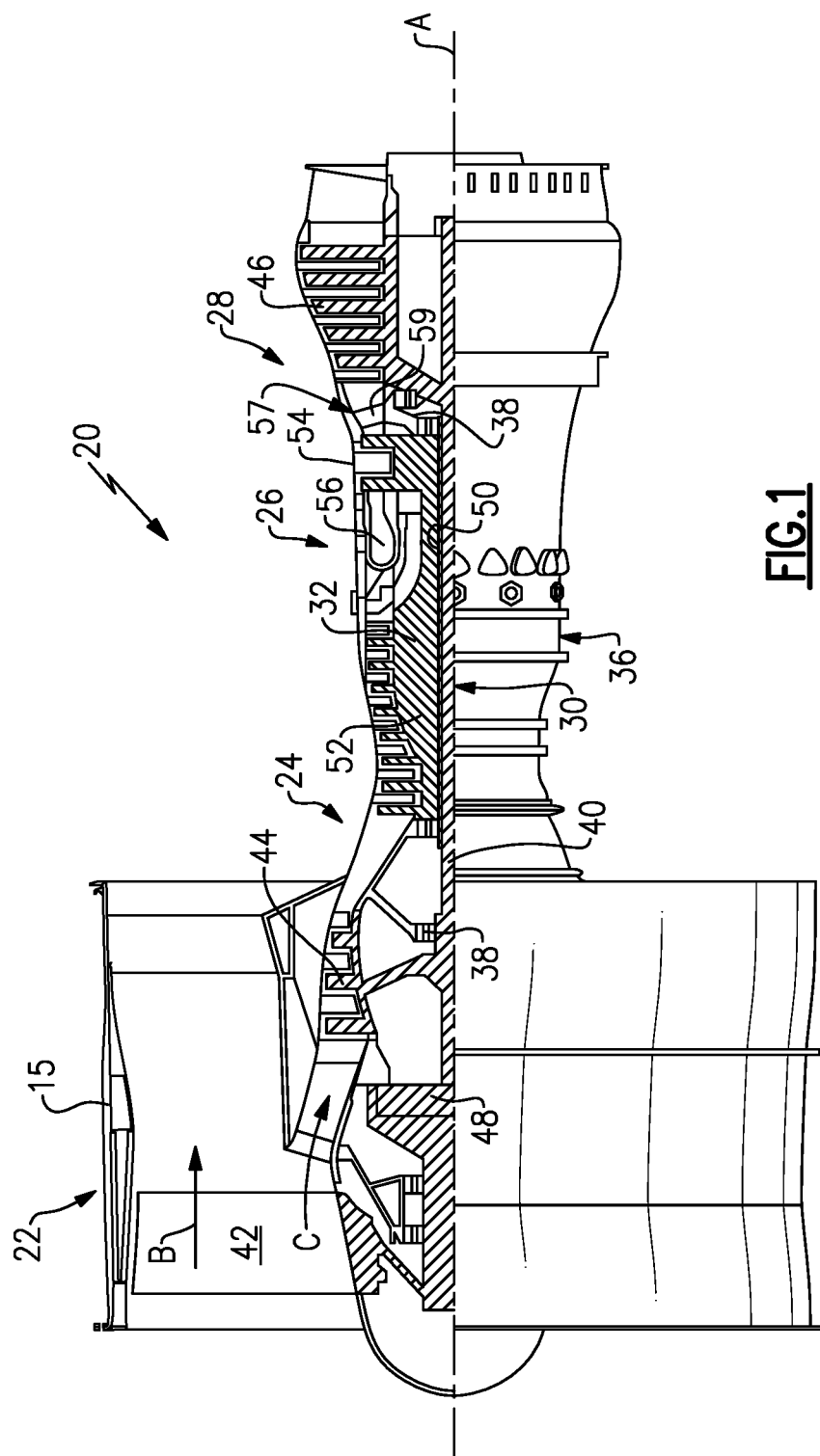
FIG. 1 schematically shows a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 drives air along a bypass flow path B in a bypass duct defined within a nacelle 15, and also drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive a fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 may be arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of the low pressure compressor, or aft of the combustor section 26 or even aft of turbine section 28, and fan 42 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1 and less than about 5:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ °R)/(518.7°\ R)]^{0.5}$. The "Low corrected fan tip speed" as disclosed herein according to one non-limiting embodiment is less than about 1150 ft/second (350.5 meters/second).

Figure 2:
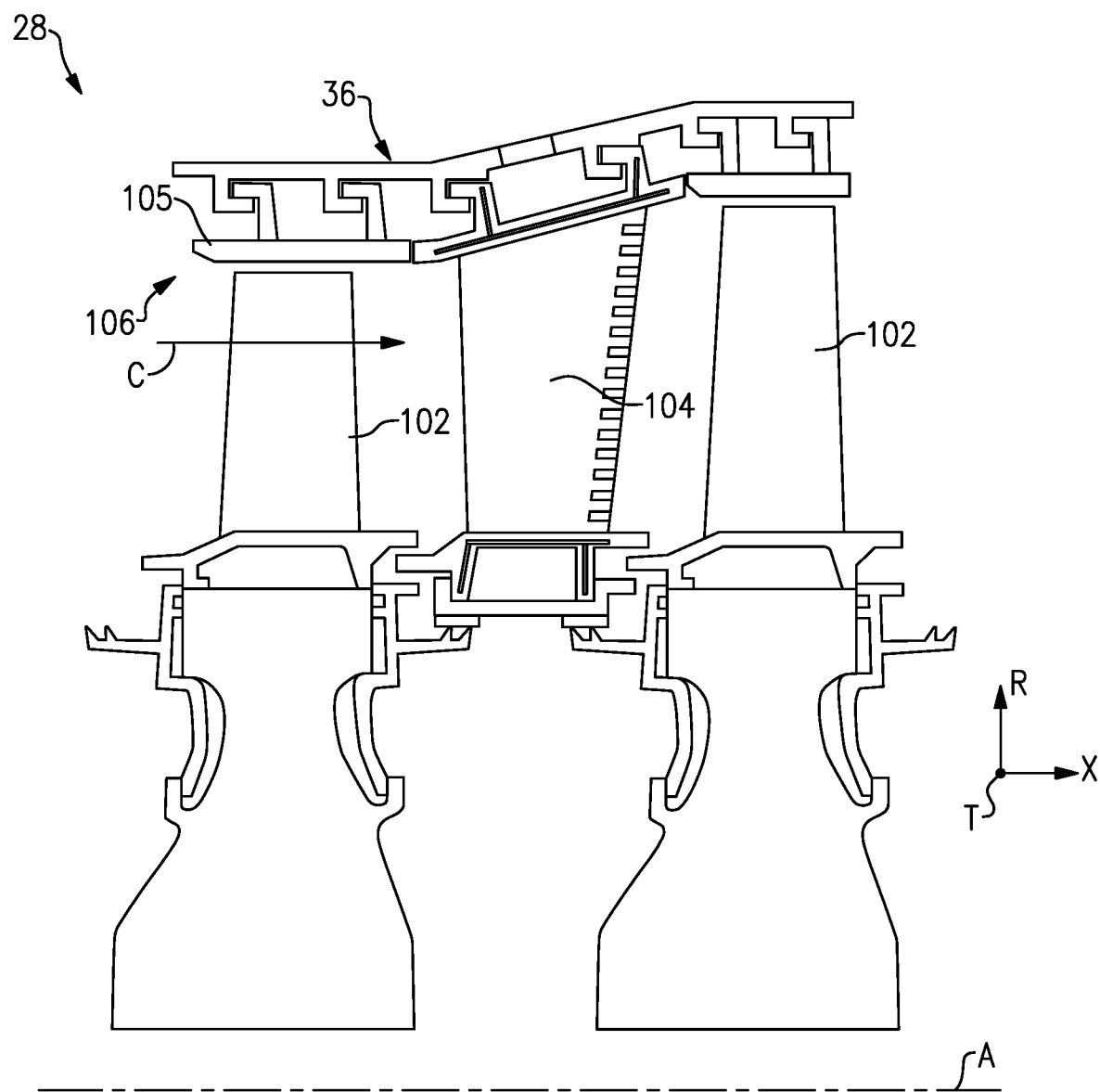
FIG. 2 schematically shows a portion of a turbine section.

FIG. 2 schematically illustrates a portion of the turbine section 28. The turbine section 28 includes alternating series of rotating blades 102 and stationary vanes 104 that extend into the core flow path C of the gas turbine engine 20. Turbine blades 102 rotate and extract energy from the hot combustion gases that are communicated along the core flow path C of the gas turbine engine 20. The turbine vanes 104, which generally do not rotate, guide the airflow and prepare it for the next set of blades 102. As is known, it is desirable to pass the bulk of products of combustion downstream of the combustor section 26 across the turbine blades 102. Thus, a blade outer air seal ("BOAS") 106 is positioned slightly radially outwardly of the outer tip of the blades 102. It should be understood that the turbine section 28 could be utilized in other gas turbine engines, and even gas turbine engines not having a fan section at all. The BOAS 106 is made up of a plurality of BOAS seal segments 105 arranged circumferentially about the axis of rotation A. In one embodiment, the BOAS seal segments 105 of the present disclosure are located on the first stage turbine blades 102 in the turbine section 28.

Figure 3:
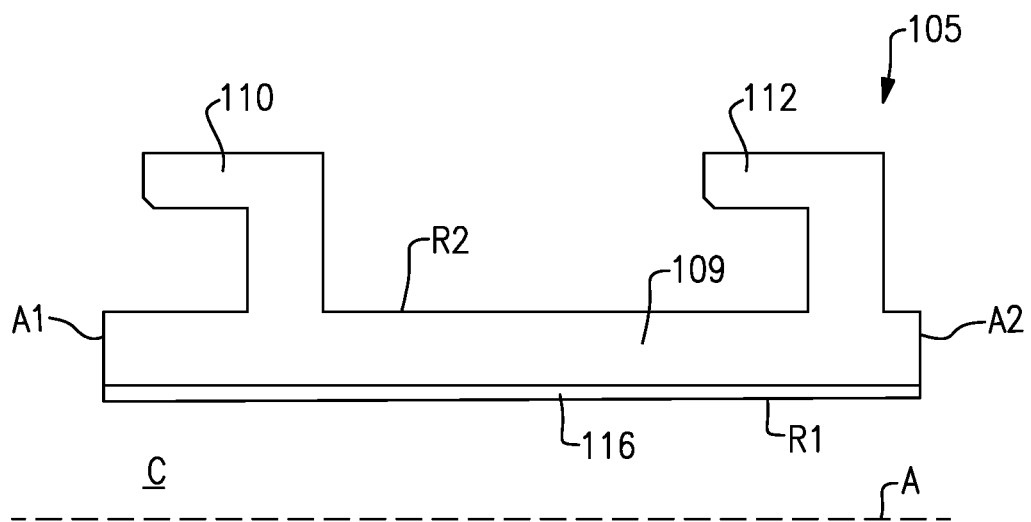
FIG. 3 shows a blade outer air seal according to exemplary embodiment.

FIG. 3 illustrates an exemplary BOAS seal segment 105 from a circumferential direction. Each seal segment 105 is a body that defines radially inner and outer sides R1, R2, respectively, and first and second axial sides A1, A2, respectively. The radially inner side R1 faces in a direction toward the engine central axis A. The radially inner side R1 is thus the hot wall or gas path side of the seal segment 105 that bounds a portion of the core flow path C. The first axial side A1 faces in a forward direction toward the front of the engine 20 (i.e., toward the fan 42), and the second axial side A2 faces in an aft direction toward the rear of the engine 20 (i.e., toward the exhaust end).

The BOAS seal segment 105 has hooks 110 and 112 and a central wall 109. In this embodiment, the BOAS seal segment 105 may be formed of a metallic alloy. Example alloys may include, but are not limited to, nickel alloys, cobalt alloys, a nickel alloy coated with cobalt or cobalt alloy, or non-nickel alloys that do not substantially react with ceramic. In another embodiment, the seal segment 105 may be formed of a ceramic matrix composite ("CMC") material, such as a silicon carbide composite, or a monolithic ceramic.

Blade outer air seals in general may include barrier coatings (e.g., thermal or environmental barrier coatings) on the gas path side that serve to protect the underlying structure, typically formed of an alloy.

An abradable coating on a BOAS seal segment 105 contacts tips of the turbine blades 102 such that the blades 102 abrade the coating upon operation of the engine 20. This provides a minimum clearance between the BOAS seal segment 105 and the tip of the blade 102. However, over time internal stresses can develop in the coating that may make the coating vulnerable to erosion and spalling.

With some known abradable coatings, the BOAS segments 105 need to be replaced after a period of use due to the spallation. In the present disclosure, a portion of the radially inner side R1 of the disclosed seal segment 105 has a geometrically segmented abradable coating ("GSAC") 116. In particular, the seal segment 105 includes the GSAC 116 in regions which are especially susceptible to spallation. A GSAC 116 forms segmentation cracks, which provide locations to accommodate the strain associated with internal stresses. That is, the energy associated with the internal stresses is maintained at a lower level due to the cracks such that there is less energy available for causing delamination cracking and spallation.

Figure 4:
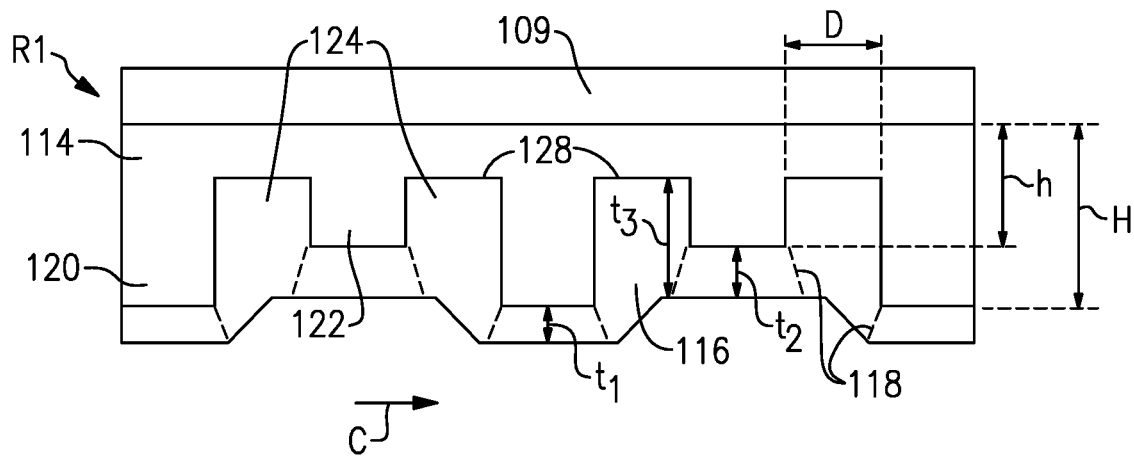
FIG. 4 shows a cross-sectional view of a portion of a blade outer air seal.

FIG. 4 illustrates a cross-sectional view of a portion of the radially inner side R1 of a BOAS seal segment 105. The BOAS seal segment 105 has a bond coat 114 radially inward of the central wall 109, and a GSAC 116 inward of the bond coat 114. The GSAC 116 may be a ceramic material, for example. The BOAS seal segment 105 includes a plurality of cavities 124. Each of the cavities 124 is filled with the GSAC 116. These cavities 124 facilitate the cracks 118 in the GSAC 116 for spallation reduction. Cracks 118 generally form at the edges formed by the cavities 124. The GSAC 116 provides the hot wall surface along the core flow path C immediately adjacent the tips of the turbine blades 102. In the illustrated embodiment, the cavities 124 are circular and have a diameter D. In some examples, each of the cavities 124 has the same diameter D. In one example embodiment, the diameter D is about 0.080 inches (2.032 mm), or the diameter D is between about 0.020 and 0.250 inches (0.508-6.35 mm). In other embodiments, the cavities 124 may be other shapes, such as oblong, rectangular, or hexagonal, for example. In these embodiments, the diameter D is a hydraulic diameter.

In the illustrated embodiment, each of the cavities 124 is drilled to the same depth relative to the central wall 109 or relative to the second radial side R2. In other words, each cavity 124 has a surface 128. When the seal segment 105 is installed into a turbine section 28, each surface 128 will have the same radial position relative to the engine central axis A.

The bond coat 114 has grooves or channels 122 machined into it. The channels 122 define a first height portion in the channel 122 relative to the central wall 109 or relative to the second radial side R2. A second height portion is defined at locations 120 outside of the channels 122. In the first height portion, the bond coat 114 has a first height h to the GSAC 116. In the second height portion, the bond coat 114 has a second height H to the GSAC 116. The second height H is greater than the first height h. In an embodiment, a ratio of the first height h to the diameter D is about 10:3.

The channels 122 and cavities 124 form three different thicknesses in the GSAC 116. A first thickness $t_1$ is defined between the location 120 and the core flow path C. A second thickness $t_2$ is defined between the channel 122 and the core flow path C. A third thickness $t_3$ is defined between the surface 128 of cavities 124 and the core flow path C. In the illustrated embodiment, the third thickness $t_3$ is the largest thickness. In some examples, the first thickness $t_1$ may be smaller than $t_2$. In other examples, the first thickness $t_1$ may be about the same as the second thickness $t_2$. The GSAC 116 will tend to follow the profile of the channels 122 in maintaining its thickness. The GSAC 116 in the cavities has about the same thickness $t_3$ at each cavity 124, for improved coating performance.

Figure 5:
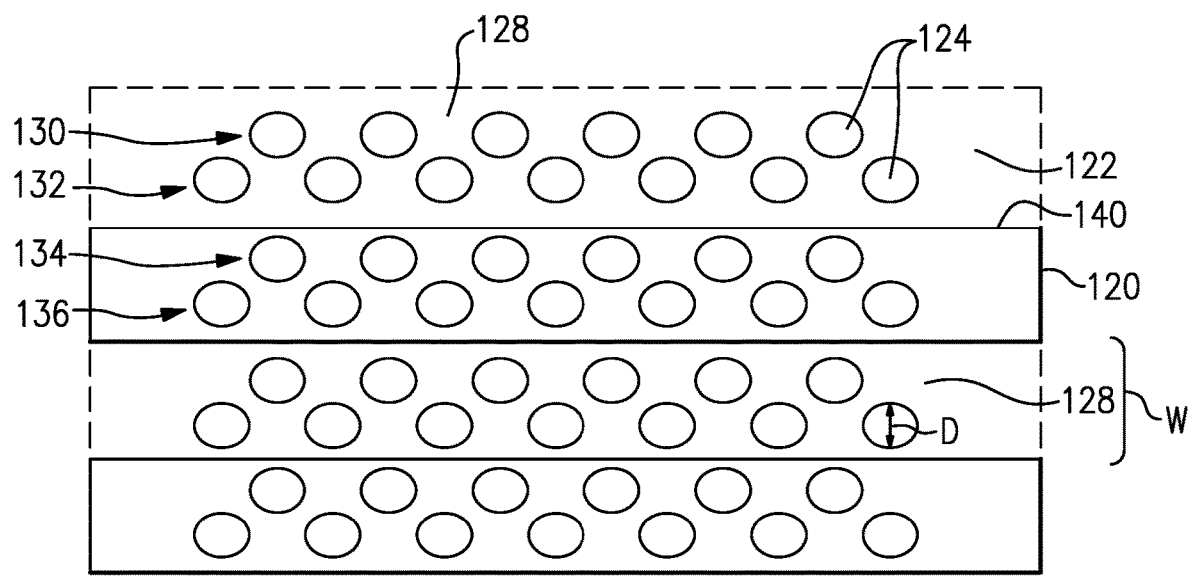
FIG. 5 shows a detail of a blade outer air seal.

FIG. 5 illustrates schematically shows a view of the first radial side R1 of the BOAS seal segment 105. In an embodiment, the cavities 124 are evenly spaced from one another and span the radially inner side R1. For example, a distance between adjacent cavities 124 is within about 10% across all of the cavities 124 on a seal segment 105. In an example embodiment, the cavities 124 span at least 60% of the radially inner side R1. There may be portions forward or aft of a blade rub track without channels 122 or cavities 124, but the channels 122 may occupy at least the full extent of the rub track of the blade, for example. This allows for the shift in that track of the blade 102 due to thermal expansion, engine and aircraft operating conditions, and various excursions. The cavities 124 may be arranged in rows 130, 132, 134, 136. In the illustrated embodiment, two rows 130, 132 are within each channel 122, while two rows 134, 136 are in the portion 120 between each channel 122. In other embodiments, a single row or more than two rows may be located in the channel 122 and the portion 120. In some embodiments, the channels 122 are generally linear and run in a circumferential direction across the BOAS seal segment 105. In another embodiment, the channels 122 may run in an axial direction, or on an angle between the axial and circumferential directions. The channel 122 has a width W. In an example embodiment, a ratio of the width W to the diameter D is greater than about 1.5. In the illustrated embodiment, the width W of the channels 122 is about the same as a width of the second height portion 120. In other embodiments, the channel 122 may be wider or narrower than the portion 120.

Figure 6:
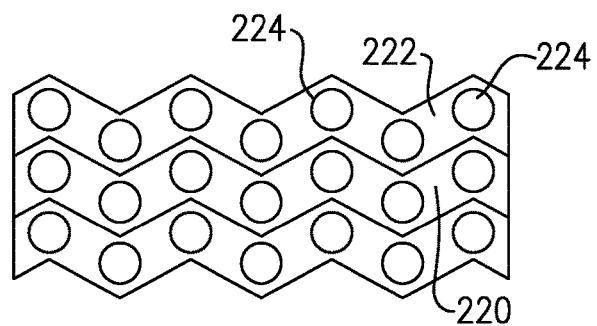
FIG. 6 shows a detail of a blade outer air seal.

FIG. 6 illustrates another example of channels 222 on the radial inner side R1 of a BOAS seal segment 105. In this example, the channels 222 are wavy, rather than linear. This embodiment has a single row of cavities 224 in each channel 222. However, the channel 222 may have more rows of cavities 224 in some examples. Other channel configurations with cavities and a GSAC may also fall within the scope of this disclosure.

A method of forming the BOAS seal segment 105 includes first forming a seal body, then machining in the channels 122. The channels 122 may be milled into the first radial side R1 of the BOAS seal segment 105, for example. Milling these channels 122 provides a sharp radius at the walls 140 (shown in FIG. 5) between the location 120 and the channel 122, which may promote formation of the cracks 118 in the GSAC 116. In other embodiments, the channels 122 may be cast into the seal segment 105. After the channels 122 are formed, the cavities 124 are drilled into the BOAS seal segment 105. Cavities 124 are drilled into both the portions 120 and the channels 122. In an embodiment, each of the cavities 124 has a bottom wall 128 at the same depth relative to the second radial side R2. When the BOAS 106 is installed, each bottom wall 128 has the same radial position relative to the engine central axis A. After the cavities 124 are drilled into the seal segment 105, a GSAC 116 is applied. The GSAC 116 fills each of the cavities 124 and forms a layer adjacent the core flow path C. The GSAC 116 will tend to follow the profile of the channels 122 in maintaining its thickness. Then, upon sintering, vertical segmentation cracks form in the GSAC 116 at sharp corners of the cavities 124 and channels 122. Each seal segment 105 is formed via this method, and then assembled into a BOAS 106 in a turbine section 28.

Some known BOAS utilize a GSAC to reduce turbine cooling and leakage air and increase rotor inlet temperature. Other known BOAS utilize grooves or channels for reducing tip clearance. However, in these known BOAS, the grooves may negatively impact the rotor inlet temperature. The above described BOAS and method utilize a GSAC with channels, which enables improved sealing performance for turbine blade tips in the first stage BOAS 106. The channels 122 in the seal segment 105 may improve sealing effectiveness, while the GSAC 116 allows higher operating temperatures before needing cooling. Thus, the BOAS 106 may enable elevated operational temperatures and increased spallation life over a BOAS with only a GSAC or grooves.

Although an embodiment of this invention has been disclosed, a worker of ordinary skill in this art would recognize that certain modifications would come within the scope of this disclosure. For that reason, the following claims should be studied to determine the true scope and content of this disclosure.

The invention claimed is:

1. A blade outer air seal, comprising:
    a seal body having a channel on a radially inner side, defining a first height portion outside of the channel and a second height portion within the channel;
    a first cavity in the first height portion and a second cavity in the second height portion, wherein each of the first and second cavities extends a depth to a radially outer surface, the radially outer surfaces of the first and second cavities are at a same position relative to the radially inner side of the seal body; and an abradable coating over the radially inner side and filling the first and second cavities.

2. The blade outer air seal of claim 1, wherein the abradable coating defines a first thickness at the first height portion and a second thickness at the second height portion, wherein the first thickness is smaller than the second thickness.

3. The blade outer air seal of claim 1, wherein a ratio of a width of the channel to a hydraulic diameter of the second cavity is greater than about 1.5.

4. The blade outer air seal of claim 1, wherein the first and second cavities are two of a plurality of cavities spaced across a rub track portion of the radially inner side.

5. The blade outer air seal of claim 1, wherein the seal body is a ceramic matrix composite material.

6. The blade outer air seal of claim 1, wherein the seal body is a metallic alloy.

7. The blade outer air seal of claim 1, wherein the abradable coating is a geometrically segmented abradable coating formed from a ceramic material.

8. The blade outer air seal of claim 1, wherein the channel is linear.

9. The blade outer air seal of claim 1, wherein the channel has a constant height in a radial direction, and is wavy relative to an axial direction.

10. The blade outer air seal of claim 1, wherein the channel extends in a circumferential direction.

11. The blade outer air seal of claim 1, wherein the cavities are circular.

12. The blade outer air seal of claim 1, the first cavity is one of a plurality of first cavities in the first height portion, the first cavities are arranged in first rows and the second cavity in one of a plurality of second cavities in the second height portion arranged in second rows, and wherein there are a same number of first rows and second rows.

13. The blade outer air seal of claim 10, wherein the channel is one of a plurality of channels extending in the circumferential direction on the radially inner side.

14. A method of forming a blade outer air seal, comprising:

forming at least one channel in a radially inner surface of a blade outer air seal body, such that the radially inner surface has a first height portion outside of the channel and a second height portion in the channel;

forming a first cavity in the first height portion and a second cavity in the second height portion, wherein each of the first and second cavities extends a depth to a radially outer surface, the radially outer surfaces of the first and second cavities are at a same position relative to the radially inner side of the seal body; and applying an abradable coating to the radially inner surface.

15. The method of claim 14, wherein the channel is milled into the radially inner surface.

16. The method of claim 14, wherein the channel is cast into the radially inner surface.

17. The method of claim 14, wherein the abradable coating fills the first and second cavities.

18. The method of claim 14, wherein the seal body is a ceramic matrix composite material.

19. The method of claim 14, wherein the seal body is a metallic alloy.

20. The method of claim 14, wherein the abradable coating is a geometrically segmented abradable coating formed from a ceramic material.

* * * * *